May 6, 1958 H. H. QUANDT 2,833,683
METHOD OF WELDING THERMOPLASTIC CONTAINER PARTS
Filed April 23, 1956
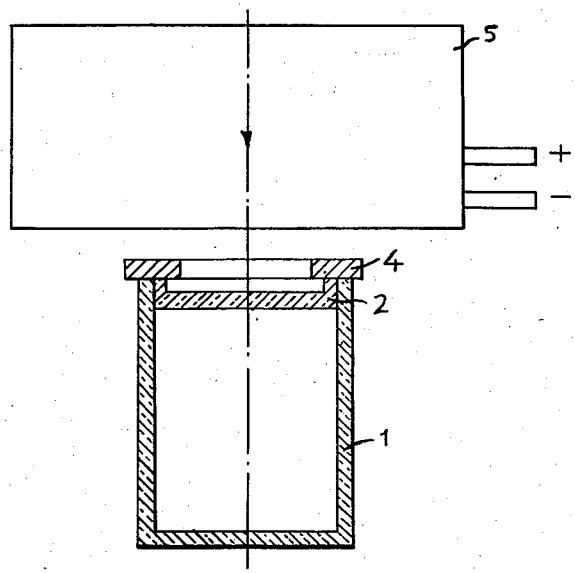
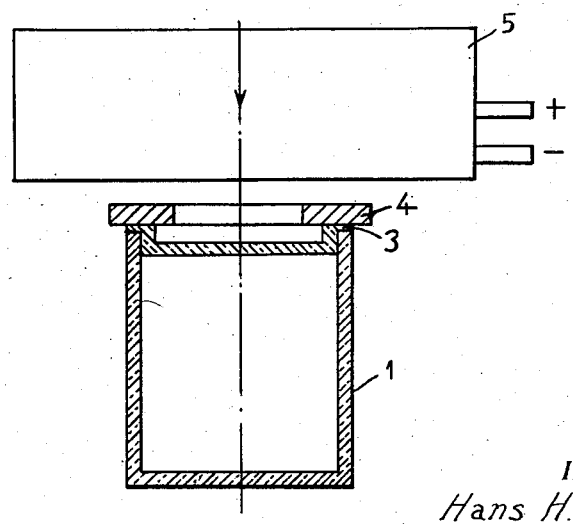
Inventor
Hans H. Quandt
By
Attorneys United States Patent Office 2,833,683
Patented May 6, 1958

2,833,683
METHOD OF WELDING THERMOPLASTIC CONTAINER PARTS

Hans Hubert Quandt, Karlsruhe, Germany, assignor to Rudolf Mohr, Karlsruhe, Germany Application April 23, 1956, Serial No. 580,090

Claims priority, application Germany April 26, 1955

1 Claim. (Cl. 154—83)

As in known, parts made of thermoplastic synthetic resin material, such as polythene, can be welded together by softening them adjacent their joining positions by the application of heat. The parts coalesce to become a unified piece, after which they are allowed to cool.

The heat for fusing the two parts together is usually supplied by a heated metal body which is placed in direct contact with the parts to be welded. The softened plastic, however, adheres to the surface of the metal body as a consequence of which the metal body cannot be pulled away from the parts immediately after coalescence, but must first be cooled until the thermoplastic material hardens. This disadvantage is particularly serious when a number of joints have to be made in succession, for example during manufacture on mass production lines, since it not only results in a considerable loss of time in cooling the heated body, which must have a sufficiently large thermal capacity to effect the welding, but also in a considerable wastage of heat. A film of oil on the surface of the metal body only temporarily removes the difficulty and to a limited extent.

The object of the present invention is to provide a method of welding thermoplastic materials which avoids the above disadvantage and enables the welding to be carried out on mass production lines. To this end, the invention consists in a method of welding together parts of thermoplastic synthetic resin material wherein an intermediate metal piece is inserted as a heat bridge between the heated body and the plastic parts to be welded. Thus although the molten plastic adheres to the intermediate metal piece, the latter does not adhere to the heated body, and hence the welded parts with the intermediate metal plate adhering thereto can be immediately removed from contact with the heated body as soon as the joint has been made. The heated body does not have to be cooled, and it can be used for welding other thermoplastic parts, with the use of further intermediate metal pieces, whilst previously welded parts are cooled and separated from the intermediate metal pieces adhering thereto. The heat bridges have a relatively small heat capacity so that they can be readily cooled. They can also be re-used, and only consume a small quantity of heat in being re-heated by contact with the heated body. Preferably the intermediate metal pieces are made from sheet metal; they may however be cast or shaped to conform with the shape of the parts to be welded.

In order that the invention may be more readily understood, reference will now be made to the accompanying drawing, in which:

Figure 1 shows the application of the method according to the invention, to the heat sealing of a cover to a container, for example of lead-sulphuric acid accumulator.

Figure 2 shows a modification of Figure 1.

Referring to Figure 1 of the drawing, 1 is a container, for example of polythene, into the open end of which is to be welded a cover member 2 which fits within the walls of the container as shown. An intermediate metal piece 4, conveniently made of sheet metal, and optionally having its centre cut out to form a frame, serves as a heat bridge and rests against the places to be welded together. When a heated metal body 5 is brought into contact with the heat bridge 4 there flows through the latter, the necessary heat for fusing the thermoplastic material which is conveyed to the places to be welded exactly as if the heated body 5 were directly in contact with the plastic parts to be welded. The disadvantage of adhesion of the plastic to the hot body is thus eliminated, the welded container and cover member cooling or being cooled in contact with the frame 4 when the hot body 5 is removed after the softening of the plastic parts. The separation of frame 4, which has a small heat capacity, from the welded plastic parts can be effected without difficulty.

Figure 2 shows a modification in which the cover 3 is provided with a peripheral flange which overlies the edges of the walls of the container 1. Heat is applied to weld the parts together, as above described, by applying the heated body 5 to the intermediate metal piece 4 resting against the cover 3.

It will be understood, that various modifications may be made without departing from the scope of the invention as defined by the appended claim.

I claim:

A method of welding a cover of thermoplastic synthetic resin material, having a central portion projecting from a peripheral flange, in the open end of a container of thermoplastic synthetic resin material, which consists in positioning the cover over the open end of the container with the central portion located in said open end and the peripheral flange seated on the edges of the side walls of the container, positioning an apertured sheet metal member in the form of a frame and acting as a heat bridge in contact with the cover so that the sides of the frame extend over the area around the peripheral flange which is to be welded to the container, applying a heated body to the heat bridge so that heat flows through said heat bridge to soften the thermoplastic material of the container at the edges of said side walls and the material of the cover over the area adjacent said flange, to cause said parts to be fused together, separating said heated body and said heat bridge out of contact with each other, cooling the welded container and cover and the heat bridge and separating the heat bridge from the cover of the container.

References Cited in the file of this patent

UNITED STATES PATENTS

| | | |
|---|---|---|
| 2,392,695 | Rohdin | Jan. 8, 1946 |
| 2,440,664 | Irons | Apr. 27, 1948 |
| 2,441,940 | Rohdin | May 18, 1948 |
| 2,697,162 | Quandt | Dec. 14, 1954 |
| 2,703,773 | Stinson | Mar. 8, 1955 |
| 2,712,343 | Stanton | July 5, 1955 |